United States Patent [19]

Ragg et al.

[11] Patent Number: 4,759,335
[45] Date of Patent: Jul. 26, 1988

[54] DIRECT FUEL INJECTION BY COMPRESSED GAS

[75] Inventors: Peter W. Ragg, Mount Lawley; Michael L. McKay, Willetton; Roy S. Brooks, South Perth, all of Australia

[73] Assignee: Orbital Engine Company Proprietary Limited, Balcatta, Australia

[21] Appl. No.: 40,779

[22] PCT Filed: Jul. 18, 1986

[86] PCT No.: PCT/AU86/00200
§ 371 Date: Mar. 11, 1987
§ 102(e) Date: Mar. 11, 1987

[87] PCT Pub. No.: WO87/00583
PCT Pub. Date: Jan. 29, 1987

[30] Foreign Application Priority Data
Jul. 19, 1985 [AU] Australia .............. PH01558

[51] Int. Cl.⁴ ............................................. F02M 23/00
[52] U.S. Cl. .................................. 123/531; 239/5
[58] Field of Search ............... 123/531, 533; 239/453, 239/459, 533.3–533.12, 5

[56] References Cited
U.S. PATENT DOCUMENTS

| | | | |
|---|---|---|---|
| 408,460 | 8/1889 | Capitaine | 123/531 X |
| 1,173,745 | 2/1916 | Rundlof | 123/531 X |
| 1,758,119 | 5/1930 | Le Moon | 239/453 X |
| 2,035,203 | 3/1936 | Smith | 239/5 |
| 3,039,699 | 6/1962 | Allen | 239/453 X |
| 3,339,848 | 9/1967 | Geiger | 239/533.4 X |
| 3,728,859 | 4/1973 | Seiler | 239/453 X |
| 4,077,374 | 3/1978 | Willmann et al. | 239/453 X |

Primary Examiner—William E. Tapolcai
Attorney, Agent, or Firm—Murray and Whisenhunt

[57] ABSTRACT

A fuel injection method and apparatus for in-cylinder injection in an internal combustion engine. Compressed air is used to inject the fuel through an injection nozzle (43) particularly shaped so that different fuel spray patterns are produced at high and low fueling rates. At higher rates of fueling corresponding to higher engine loads the fuel spray pattern is narrower and penetrates further into the cylinder volume whereas at lower rates of fueling corresponding to lower engine loads the fuel spray pattern is wider, less penetrating and relatively more confined. By appropriate selection of nozzle shape the spatial distribution of the fuel spray droplets can be made to vary favorably over a range of engine loads.

26 Claims, 3 Drawing Sheets

DIRECT FUEL INJECTION BY COMPRESSED GAS

This invention is directed to fuel injection systems for internal combustion engines and in particular injection of fuel directly into the combustion chamber. The invention has particular applicability to spark ignited two stroke and four stroke cycle engines.

Considerable effort has been expended in developing direct (in-cylinder) injection systems for internal combustion engines. Most of the work has been for diesel injectors but recently spark ignited engines have received more detailed attention.

In U.S. patent application Ser. No. 740067 and corresponding Australian Patent Application No. 32132/84 there is described a direct injection system particularly suited for use on spark ignited engines. A metered amount of fuel is delivered into a holding chamber, and a valve is opened to allow compressed air to propel the fuel through the valve into a combustion chamber of the engine. The metered amount of fuel is varied in accordance with the engine load. The injector nozzle incorporates the above mentioned valve, so the valve performs the function of timing the fuel delivery and effecting atomisation of the fuel.

The characteristics of the spray of the fuel droplets issuing from the nozzle into a combustion chamber have major effects on the efficiency of the burning of the fuel, which in turn affects the stability of the operation of the engine, the fuel efficiency, and the exhaust emissions. To optimise these effects, in a spart ignited engine, the desirable characteristics of the spray pattern of the fuel issuing from the nozzle include small fuel droplet size, controlled penetration of the fuel spray into the combustion chamber, and at least at low engine loads a relatively contained evenly distributed cloud of fuel droplets.

In the control of the harmful components of the engine exhaust, it is desirable to control the placement of the fuel within the gas charge in the combustion chamber to meet a number of different parameters. Ideally the fuel should be distributed in the gas charge so that the resultant fuel-air mixture is readily ignitable at the spark plug, all the fuel has access to sufficient air to burn completely, and the flame maintains a sufficient temperature to extend to all the fuel before being extinguished. There are other factors that must also be considered, such as charge temperature that may promote detonation, or the formation of undesirable contaminants in the exhaust gas.

It has been found from our experiments on direct fuel injection of two stroke engines that, under light enging loads, the most favourable combustion characteristics are achieved when the fuel is introduced to the combustion chamber in as fine a droplet size as possible, and in a diffused cloud but relatively confined in the area of the spark plug.

In addition it has been found that for high engine loads, the most favourable combustion characteristics are achieved when the fuel is again introduced in as fine a droplet size as possible but with a much more extensive spacial distribution of the fuel cloud deeper into the combustion chamber than for the fuel cloud under light load conditions.

Although the pneumatic injection systems described in the above patent applications provide the desirable fine atomisation of fuel droplets, and an injection period sufficiently short to be used in modern two stroke engines, it has also been found up until this time that an injection valve which provided the correct fuel spray distribution for low engine loads gave a less acceptable distribution for high engine loads. Similarly, an injection valve which provided the required distribution for high engine loads did not perform as well at low loads. Thus in practice it was found necessary to use an injection valve which compromised performance at both extremes of operational load range in order to achieve the best overall performance from the engine.

One technique which has been partly successful in overcoming this problem has been to vary the pressure of the propellant air, but this can produce both insufficient atomization of the fuel and excessively high injector nozzle temperatures when lower pressures are used.

We have now found that by careful attention to design and positioning of injector nozzles, the spacial distribution of the fuel droplets can be made to vary favourably over a wide range in response to engine load.

Accordingly, in one aspect the present invention provides a method of injecting liquid fuel into a spark ignited internal combustion engine having a combustion chamber comprising entraining a metered quantity of liquid fuel in a gas charge, varying the metered quantity of fuel in response to the load demand of the engine, and delivering the fuel-gas charge to the combustion chamber through a selectively openable port, said port being configured and the flow conditions through the port being selected so that at metered quantities of fuel below a first predetermined value the fuel spray issuing into the combustion chamber has a degree of penetration into the combustion chamber less than that of the fuel spray issuing when the metered quantity of fuel is above a second predetermined value greater than said first.

More specifically there is provided a method of injecting liquid fuel into a spark ignited engine having a combustion chamber, said method comprising entraining a metered quantity of fuel in a gas charge externally of the combustion chamber, varying the metered quantity of fuel in response to the load demand of the engine, controlling the gas charge so that the density of the combined fuel-gas charge increases as the metered quantity of fuel increases, and delivering the fuel-gas charge to the combustion chamber through a selectively openable port, said port having a divergent internal peripheral wall along which said fuel-gas charge flows during delivery to the combustion chamber and a divergent annular terminal wall extending from the larger end of same peripheral wall at a greater angle of divergence, and selecting the flow conditions through said port so that at fuel-gas charge densities below a predetermined value the flow of the fuel-gas charge will deflect at the junction of the peripheral and terminal walls towards the terminal wall.

Conveniently the air charge is maintained at a substantially fixed mass for each fuel delivery so that changes in the metered quantity of fuel entrained therein will effect a corresponding change in the fuel-air charge density. The predetermined fuel-air charge density is selected so that at low engine loads the flow of the fuel-air charge is deflected towards the terminal wall. This deflection of the fuel-air charge flow will increase the width of the fuel spray issuing into the combustion chamber so producing a low penetration spray. At high engine loads the increased fuel quantity and corresponding increased fuel-air charge density will result in the fuel-air charge having an increased momentum as it flows along the internal peripheral wall of the port. Accordingly, on the charge reaching the junction of the internal peripheral wall with the terminal wall its greater momentum will cause it to continue to flow generally in the direction of continuance of the peripheral wall rather than deflect to follow the terminal wall. The absence of deflection of the fuel-air charge to follow the terminal wall results in a narrower fuel spray and hence a more penetrating spray. The increased density and resulting momentum will also contribute to creation of a more penetrating spray.

The deflection of the fuel-air charge at low densities to follow the terminal wall arises from a wall attachment effect whereby under appropriate conditions a fluid flowing along a surface will change its direction of flow to follow a change in direction of the surface rather than separate from the surface.

By appropriate selection of the change of angle of divergence between the peripheral and terminal walls of the port, and with regard to the flow conditions of the fuel-air charge through the port, it is possible to select the fueling rate at which the fuel-air charge ceases to be deflected to follow the direction of the terminal wall. In this respect it is to be understood that there is an area of transition between the influence of the wall attachment effect and the dominance of the momentum effects. That is over a relatively narrow range of density of the fuel-air charge some of the charge will be deflected to follow the terminal wall and another part will continue in the direction of the peripheral wall.

The method of injecting a liquid fuel to an engine as above described has provided the ability to effect a change in the fuel spray pattern between low and high fueling rates automatically in a preselected manner. At low fueling loads a wide, low-penetration spray pattern is provided which automatically changes to a narrow, high-penetration spray pattern at high fueling load.

The providing of a low penetration spray is of particular importance at low fueling rates, that is at low engine loads, in controllng hydrocarbons (HC) in the engine exhaust gas. At low loads the quantity of fuel injected per cycle is low and if dispersed widely through the engine gas charge will result in poor ignitability and flame stability. To avoid or reduce these adverse effects it is necessary to generally limit the distribution of the fuel in the engine gas charge, and particularly to establish a rich mixture in the immediate vicinity of the ignition point (spark plug). In this way the charge is readily ignitable due to the rich mixture at the spark plug, and the relatively small quantity of fuel is not dispersed thinly through the complete engine gas charge, nor is the fuel distributed to highly quenched areas of the combustion chamber, either of which will contribute to low penetration of the flame and resultant unburnt fuel to report as HC in the exhaust.

At high fuelling rates it is desirable to distribute the fuel more extensively throughout the engine gas charge so that the fuel is exposed to sufficient oxidant (air) to achieve complete combustion of all of the fuel. Accordingly, deep penetration of the fuel into the engine gas charge is required and so a narrow fuel-air charge spray is preferred to reduce possible unburnt fuel and resultant HC in the exhaust.

Conveniently each metered quantity of fuel is entrained in an individual mass of air, with the mass of air for each cycle of the engine remaining substantially uniform irrespective of the engine fuel demand. Accordingly, the density of the fuel-air charge will vary directly with the engine fuel demand. Preferably the individual mass of air is supplied at a regulated fixed pressure and the period that communication exists for delivery of the air entrained fuel to the combustion chamber is constant for each engine cycle, thereby substantially the same mass of air is available each cycle for delivery of the fuel.

The condition whereby the fuel-air will experience the wall attachment effects during delivery through the nozzle would normally involve a number of factors in addition to the density of the fuel-air charge and the angle between the peripheral and terminal surfaces. The additional conditions include the velocity of the charge through the nozzle, the extent of opening of the valve element operable to establish the flow through the nozzle, the size of the fuel droplets in the fuel-air charge, and the geometric relation of other surfaces in the flow path of the fuel-air charge. However, these conditions are not conveniently varied during operation of an engine, and are therefore considered fixed conditions for any particular fuel injection system.

As previously discussed the density of the fuel-air charge will automatically vary with fueling rate, and so by selection of the angle between the peripheral and terminal surfaces the change in direction of the charge flow can be achieved at the desired fueling rate.

The invention will be more readily understood from the following description of a practical arrangement of apparatus for delivery of fuel to an engine and several constructions of the valve controlled nozzles through which a fuel-air mixture is delivered to the combustion chamber of an engine.

In the drawings.

Figure 1:
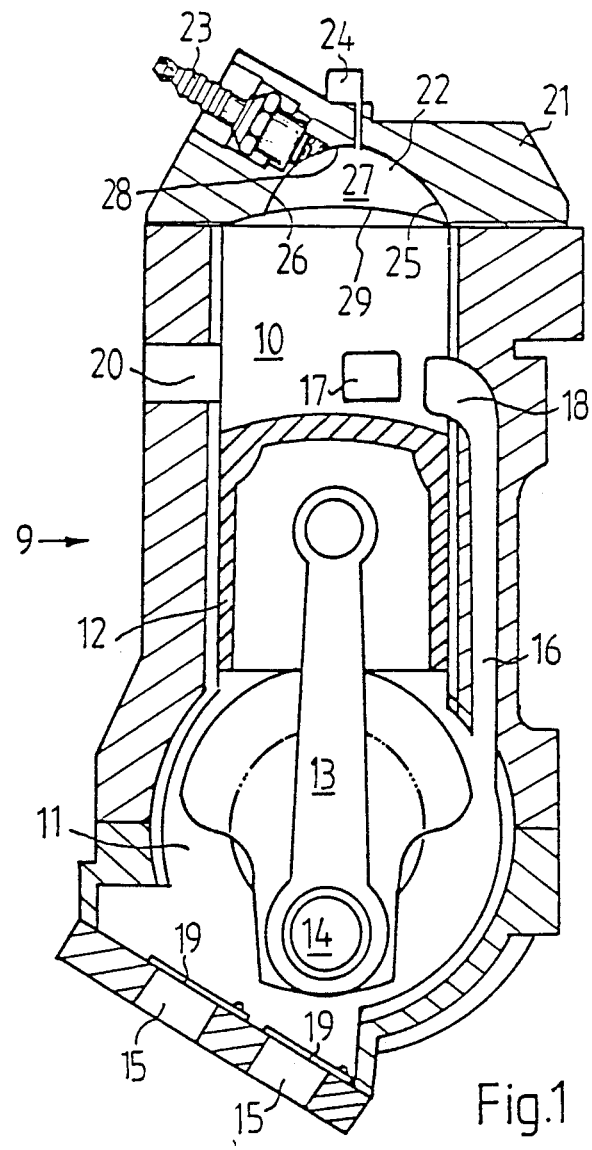
FIG. 1 is a sectional view of a two stroke cycle engine to which the presently proposed fuel injection method and apparatus is applied.

Referring now to FIG. 1 the engine 9 is a single cylinder two-stroke cycle engine, of generally conventional construction, having a cylinder 10, crankcase 11 and piston 12 that reciprocates in the cylinder 10. The piston 12 is coupled by the connecting rod 13 to the crankshaft 14. The crankcase is provided with air induction ports 15 incorporating conventional reed valves 19 and three transfer passages 16 (only one shown) communicate the crankcase with respective transfer ports, two of which are shown at 17 and 18, the third being the equivalent of 17 on the opposite side of port 18.

The transfer ports are each formed in the wall of the cylinder 10, normally with their respective upper edge located in the same diametral plane of the cylinder. An exhaust port 20 is formed in the wall of the cylinder generally opposite the central transfer port 18. The upper edge of the exhaust port is slightly above the diametral plane of the transfer ports' upper edges.

The detachable cylinder head 21 has a combustion cavity 22 into which the spark plug 23 and fuel injector nozzle 24 project. The cavity 22 is located substantially symmetric with respect to the axial plane of the cylinder extending through the centre of the transfer port 18 and exhaust port 20. The cavity 22 extends across the cylinder from the cylinder wall immediately above the transfer port 18, to a distance past the cylinder centre line.

The cross sectional shape of the cavity 22 along the above referred to axial plane of the cylinder is substantially arcuate at the deepest point or base 28, with the centre line of the arc somewhat closer to the center line of the cylinder than to the cylinder wall above the transfer port 18. The end of the arcuate base 28 closer to the cylinder wall above the transfer port 18, merges with a generally flat face 25 extending to the underface 29 of the cylinder head 21 adjacent the cylinder wall. The face 25 is inclined upwardly from the cylinder wall to the arcuate base 28 of the cavity.

The opposite or inner end of the arcuate base 28 merges with a relatively short steeply inclined face 26 that extends to the underface 29 of the cylinder head. The face 26 meets the underface 29 at a relatively steep angle. The opposite side walls of the cavity (one only being shown at 27) are generally flat and parallel to the above referred to axial plane of the cylinder, and so also meet the underface 29 at a steep angle.

The injector nozzle 24 is located near the deepest point of the cavity 22, while the spark plug 23 projects into the cavity 22 at the end of the cavity remote from the transfer port 18. Accordingly, the air charge entering the cylinder passes along the cavity past the injector nozzle 24 toward the spark plug and so carries the fuel from the nozzle to the spark plug.

Further details of the form of the cavity 22 and of the combustion process derived therefrom are disclosed in our British Patent Application No. 8612601 lodged on May 23, 1986 and the corresponding United States Patent Application lodged on May 26, 1986 entitled "Improvements Relating to Two Stroke Cycle Internal Combustion Engines", inventors Schlunke and David, the disclosures of which are hereby incorporated by reference.

Figure 2:
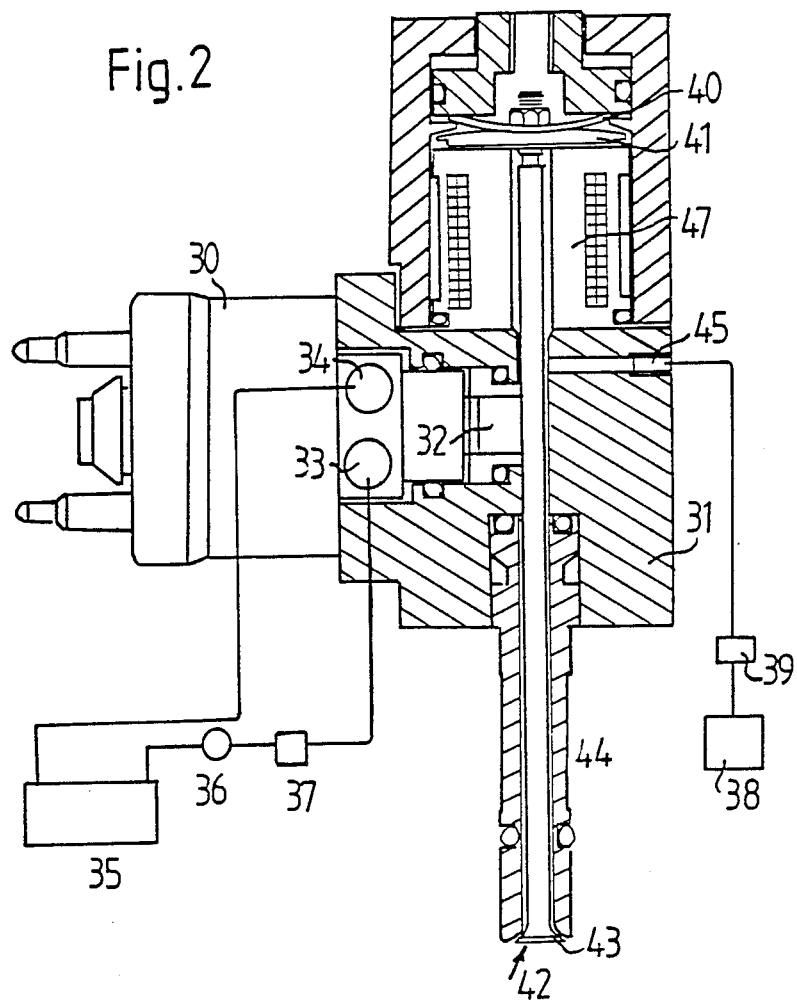
FIG. 2 is an elevational view partly in section of a fuel metering and injection device in which the present invention is applied.

The injector nozzle 24 is an integral part of the fuel metering and injection system whereby fuel entrained in air is delivered to the combustion chamber of the engine by the pressure of an air supply. One particular form of fuel metering and injection unit is illustrated in FIG. 2 of the drawings.

The fuel metering and injection unit incorporates a suitable fuel metering device 30, such as a commercially available automobile type throttle body injector, coupled to an injector body 31 having a holding chamber 32 therein. Fuel is drawn from the fuel reservoir 35 and delivered by the fuel pump 36 via the pressure regulator 37 through fuel inlet port 33 of the metering device 30. The metering device operating in the known manner meters an amount of fuel into the holding chamber 32 in accordance with the engine fuel demand. Excess fuel supplied to the metering device is returned to the fuel reservoir 35 via the fuel return port 34. The particular construction of the fuel metering device 30 is not critical to the present invention and any suitable device may be used.

In operation, the holding chamber 32 is pressurised by air supplied from the air source 38 via the pressure regulator 39 through the air inlet port 45 in the body 31. The injection valve 43 is actuated to permit the pressurised air with the metered amount of fuel therein to be discharged through injector port 42 into a combustion chamber of the engine. Injection valve 43 is of a poppet valve construction opening inwardly to the combustion chamber, that is, outwardly to the holding chamber.

The injection valve 43 is coupled, via the valve stem 44, which passes through the holding chamber 32, to the armature 41 of the solenoid 47 located within the injector body 31. The valve 43 is biased into the closed position by the disc springs 40 and opened by energising of the solenoid 47. Energising of the solenoid 47 is controlled in timed relation to the engine cycle to effect delivery of the fuel from the holding chamber 32 via the valve 43 to the engine combustion chamber.

Further details of the operation of the fuel injection system incorporating a holding chamber is disclosed in Australian Patent Application No. 32132/84 and corresponding U.S. patent application Ser. No. 740067 filed April 2, 1985. Alternative forms of injectors suitable for the present invention are described in our International Patent Application No. PCT/AU85/00176 (WO 86/00960). The disclosures of the above three applications are each incorporated herein by reference.

Figure 4:
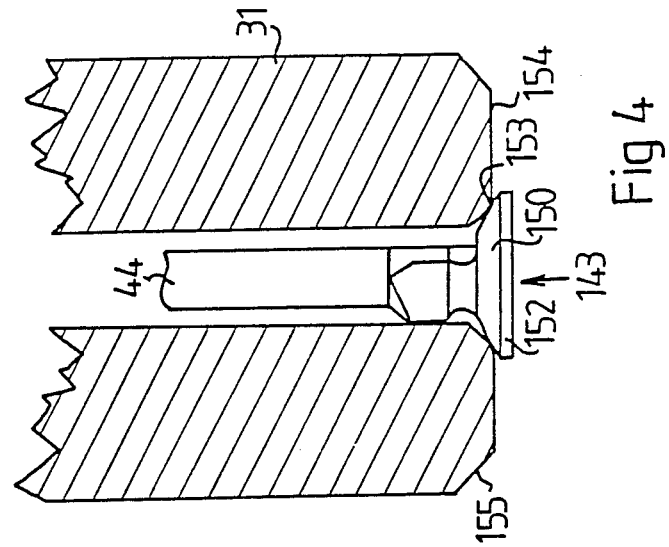
FIG. 4 is a view similar to FIG. 3 of an alternative configuration of the port of the metering and injection device.
Figure 3:
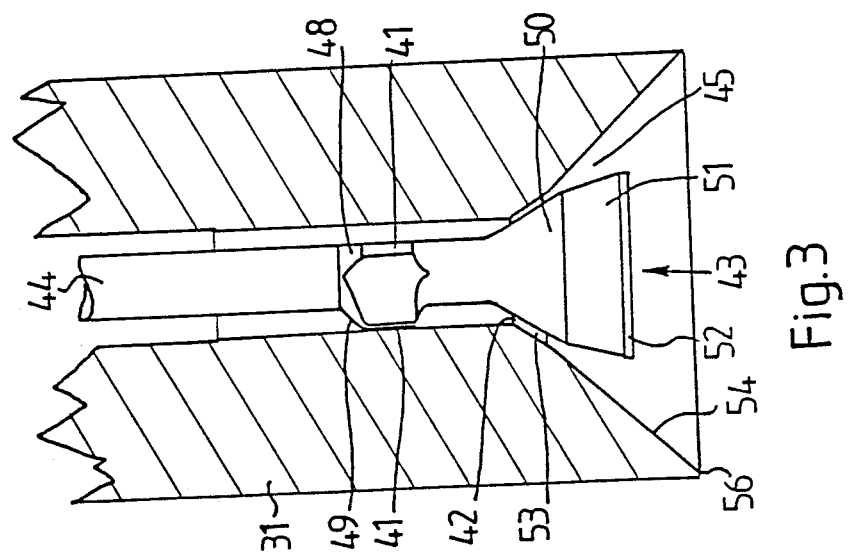
FIG. 3 is an enlarged sectional view of the valve area of the metering and injection device shown in FIG. 2, but illustrating a slightly different valve configuration.

As can be seen in more detail in FIGS. 3 and 4 the valve stem 44 has a collar portion 48 with three equally spaced lobes 49 the peripheral surfaces 41 of which serve as bearing surfaces against the relevant portion of the internal surface of the chamber 32 in the injector body 31. This construction provides support and guidance for the stem 44 during opening and closing movement of the valve, and passages between the lobes 49 for the fuel-air charge when the valve is open.

Whth respect to FIG. 3, the head of the valve 43 includes the conical seal portion 50 diverging from the stem 44 and the conical guide portion 51 extending from the outer end of the seal portion 50, to the terminal cylindrical edge 52. The seal portion 50 conveniently has an included angle of 60° and the guide portion 51 conveniently has an included angle of 30°. The port 42 in the end of the body 31 has a conical seal portion 53 which complements the seal portion 50 of the valve and co-operates therewith to close the port 42. The terminal conical portion 54 extends from the outer end of the seal portion 53 to the edge 56 of the body. Conveniently the terminal conical portion 54 has an included angle of 96°.

It will be appreciated that when the port 42 is open as shown in FIG. 3 an annular throat 45 is defined between conical portions 51 and 54. When the inclination of these respective surfaces are as indicated above the angle between the opposite walls of the throat is 18°. In the example illustrated the diameter of the cylindrical edge 52 of the valve 43 is 4.7 mm, the maximum diameter of the terminal conical portion 54 is 12 mm and the lift of the valve 43 is 0.35 mm.

In this configuration of the port 42 and valve 43 the fuel-air charge will issue from between the parallel seal portion 50 of the valve 43 and seal portion 53 of the port 42 as an annular curtain of fuel droplets entrained in air. If the fuel content of the fuel-air charge is such that the density of the charge is below a selected value, which will be discussed further hereafter, the fuel-air charge curtain will deflect due to the wall attachment effect from the direction of the surfaces of the seal portions 50 and 53 at the outer end thereof to flow along the surface of the conical terminal portion 54 of the port 42. The fuel-air charge will remain in the annular curtain form but has a larger included angle, and results in the fuel spreading outward in the combustion chamber with a reduced axial penetration.

As the fueling content of the fuel-air charge increases, with increase in engine load, the density will rise, and when it rises above said selected value the wall attachment effect is overcome by the momentum of the fuel droplets and the annular curtain of fuel generally continues in the direction it issued from between the surfaces of the seal portions 50 and 53. Accordingly the fuel-air charge remains in a narrower annular curtain, with a greater velocity component in the axial direction of the nozzle, and will therefore penetrate more deeply into the engine air charge.

It is to be understood that as the density of the fuel-air charge increases there is not an instantaneous break down of the wall attachment effect, but the fuel-air charge annular curtain switches from a wide to a narrow form through a band of charge density. However, that band is narrow compared with the total range of densities experienced over the full engine load range.

In a typical practical application of the injector unit above described the regulated air supply to the chamber 32 is at 550 KPa and the valve 43 is opened for a period of 4 milliseconds for each fuel injection cycle.

Under these conditions the nominal mass of air effecting each fuel delivery to the engine is approximately 8 mg. and, if the fuel demand at which the fuel curtain will switch from the narrow to wide form is 5 mg. of fuel per delivery cycle, the fuel-air charge density at the change is approximately 0.625.

The degree of penetration of the fuel is desirably low at low load engine conditions and high at high load conditions, however the load at which it is most beneficial to effect the change in penetration is dependent on a number of factors. Accordingly, the selection of the fuel-air charge density at which the switch in the fuel shape is to occur is largely an individual choice. One of the principal factors is the level of exhaust emissions at low loads in relation to power output at higher loads. A low penetration spray is desirable to limit exhaust emissions at low loads but if this level of penetration is maintained at higher loads the power output and fuel consumption performance may suffer. Nevertheless in some engine applications it may be acceptable to sacrifice power for the sake of restricting exhaust emissions, and so switch the fuel spray higher in the load range than would otherwise normally be selected.

Accordingly, the selection of the fuel density at which switching of the spray is to occur is at the discretion of the designer, and once selected the design of the relevant surfaces of the injection nozzle may be determined by the known principles of the fluid wall attachment effect. It has been found that some experimental development of the nozzle design is generally necessary to optimise the performance, due to the difficulty in determining the precise operating conditions in the engine combustion chamber and the nozzle under operating conditions.

An alternative configuration of the valve and port of the metering and injector unit is shown in its closed position in FIG. 4. In this construction the valve 143 has a conical seal portion 150 and a cylindrical edge portion 152. The port 142 has a seal portion 153, to co-operate with the valve seal portion 150, and a diametral terminal portion 154. The general construction of the valve stem 44 and guide lobes 39 are identical to that previously described with reference to FIG. 3.

The seal portions 150 and 153 each have an included angle of 120°, symmetrical with the valve axis, and the terminal portion 154 is normal to the valve axis, that is it has an included angle of 180°. The valve 143 projects beyond the plane of the terminal portion 154, and the angle between the projecting portion of the seal portion 150 and terminal portion 154 is 30°.

The curtain of fuel-air charge would normally issue from the port 142 as a continuation of the seal portions 150 and 153 and is thus of a conical form with an included angle of 120°. However, when the density of the fuel-air charge is below a certain value the wall attachment effect will result in deflection of the curtain to flow along the terminal portion 154 whereby the included angle of the curtain is 180°.

The inclined surface 155 determines the extent of the flow of the fuel-air charge along the terminal portion 154 in the direction radial to the valve and port axis. The inclination of the surface 155 to the terminal surface is such that the wall attachment effect will not cause the charge to deflect on leaving the terminal face to follow the inclined surface.

In both of the embodiments shown in FIGS. 3 and 4 the angle between the seal portion of the port or valve and the terminal portion of the port may vary between 15° and 40° depending upon the fueling rate at which the switching of the fuel-air charge curtain is required. Also the valve may project beyond the terminal portion of the port as in FIG. 4 or be recessed as in FIG. 3. A recessed valve may be used with a diametral terminal portion of the port, that is the valve 143 in FIG. 4 may be recessed below the plane of the terminal portion 154.

In the present specification specific reference has been made to the use of the present invention in conjunction with an engine operating on the two stroke cycle and with spark ignition and reciprocating piston, however it is to be understood that the method and apparatus for injecting liquid fuel as herein described is equally applicable to engines operating on the four stroke cycle and/or of other configuration such as rotary piston. The method and apparatus is applicable to internal combustion engines for all uses, but is particularly useful in contributing to fuel economy and control of exhaust emissions in engines or in vehicles, including automobiles, motor cycles and boats including outboard marine engines.

We claim:

1. A method of injection liquid fuel into a spark ignited internal combustion engine having a combustion chamber, comprising, entraining a metered quantity of liquid fuel in a gas charge to provide a fuel-gas charge, varying the metered quantity of fuel in response to the load demand of the engine, delivering the fuel-gas charge to the combustion chamber through a selectively openable port, having a fixed configuration when open, and controlling the fuel to gas ratio of the fuel-gas charge delivered through the open port so that at metered quantities of fuel below a predetermined value the fuel spray issuing from the open port into the combustion chamber has a degree of penetration less than that of the fuel spray issuing from the open port when the metered quantity of fuel is above said predetermined value.

2. A method of injecting liquid fuel into a spark ignited internal combustion engine having a combustion chamber, comprising entraining a metered quantity of liquid fuel in a gas charge to provide a fuel-gas charge, varying the metered quantity of fuel in response to the load demand of the engine, subjecting the fuel-gas charge to a pressure substantially independent of the metered quantity of fuel, selectively opening a port having a fixed configuration when open, delivering the fuel-gas charge through said port to the combustion chamber as a fuel spray in response to said pressure, said port being configured so when open, the flow of the fuel-gas charge through the port will respond to the metered quantity of fuel in the fuel-gas charge to establish, at metered quantities of fuel below a first predetermined value, the fuel spray issuing from said port with a degree of penetration into the combustion chamber less than that of the fuel spray issuing from said port when the metered quantity of fuel is above a second predetermined value greater than said first value.

3. A method as claimed in claim 1 or 2 wherein at metered quantities of fuel above said second predetermined value said fuel spray substantially maintains a trajectory corresponding to that imparted thereto during passage through said port, and at metered quantities below said first predetermined value is deflected outward from said trajectory upon issuing from said port.

4. A method as claimed in claim 1 or 2 wherein the gas charge is a substantially fixed mass for each delivery of fuel to the combustion chamber whereby the density of the fuel-gas charge issuing from the port varies in response to the variation in the metered quantity of fuel.

5. A method as claimed in claim 1 or 2 wherein the fuel spray issues in a generally conical form having an inclined angle that is greater when the fuel quantity is below said first predetermined value than when the fuel quantity is above said second predetermined value.

6. A method as claimed in claim 1 or 2 wherein the port when open defines an annular diverging passage through which the fuel-gas charge issues into the combustion chamber, and a coaxial annular surface extends outward from the end of the passage at a greater divergence than said passage, so that at metered quantities of fuel below said first predetermined value the fuel spray is deflected outwardly upon leaving the annular passage to flow across said annular surface.

7. A method as claimed in claim 6 where the gas charge is controlled so the density of the fuel-gas charge increases as the metered quantity of fuel increases.

8. A method as claimed in claim 6 wherein the gas charge is a substantially fixed mass for each delivery of fuel to the combustion chamber whereby the density of the fuel-gas charge issuing from the port varies in response to the variation in the metered quantity of fuel.

9. A method as claimed in claim 1 or 2 wherein the gas charge is maintained at a regulated pressure and the port is opened for a fixed period, during each cycle of fuel delivery to the combustion chamber.

10. A method as claimed in claim 2 wherein the port is configured and the flow conditions through the port is selected so that when the port is open and at metered quantities of fuel below the first predetermined value the fuel spray issuing into the combustion chamber is projected over a wider angle from the port than that of the fuel spray issuing when the metered quantity of fuel is above the second predetermined value.

11. A method as claimed in claim 6 wherein the port is located so that the fuel spray issuing when the metered fuel quantity is below said first predetermined value, establishes a fuel cloud in the area of ignition initiation in the combustion chamber.

12. Apparatus for injecting liquid fuel into a combustion chamber of a spark ignited internal combustion engine comprising means to establish a mixture of liquid fuel and gas as a fuel-gas charge for delivery to the combustion chamber, metering means to vary the quantity of fuel in said charge in accordance with the engine load demand, and means to deliver said fuel-gas charge through a selectively openable port to the combustion chamber as a fuel spray, said port having a fixed configuration when open selected to cause the fuel-gas charge to respond to the quantity of fuel therein so that at metered quantities of fuel below a first predetermined value the fuel spray issuing from the port into the combustion chamber has a degree of penetration into the combustion chamber less than that of the fuel spray issuing when the metered quantity of fuel is above a second predetermined value greater than said first.

13. Apparatus as claimed in claim 12 wherein the means to establish the fuel-gas charge includes a chamber into which the metering means delivers the metered quantity of fuel, and said selectively openable port is arranged to communicate said chamber with the combustion chamber when open.

14. Apparatus as claimed in claim 12 wherein the means to deliver the fuel-gas charge includes means to subject the fuel-gas charge to a propulsive pressure when said port is open, said pressure being substantially independent of the metered quantity of fuel.

15. Apparatus as claimed in claim 12, 13 or 14 including means to open said port for a substantially uniform period for each delivery to the combustion chamber.

16. Apparatus as claimed in claim 12, 13 or 14 wherein said port when open defines an annular passage divergent in the direction of flow of the charge therethrough and a coaxial annular surface extending outwardly from said passage at the downstream end thereof at a divergent angle greater than that of the passage, so that at metered quantities of fuel below said first predetermined value the fuel spray issuing from the passage will deflect outwardly to flow across said annular surface.

17. Apparatus as claimed in claim 16 wherein the included angle of the divergent annular surface is 15° to 40° greater than the included angle of the divergent annular passage.

18. Apparatus as claimed in claim 16 wherein the annular surface is substantially diametral to the axis of the annular passage.

19. An internal combustion engine having a combustion chamber and spark means to ignite a fuel-air mixture in the combustion chamber, and apparatus as claimed in claim 12, 13 or 14 having said port located so that the fuel spray issuing when the metered quantity is below said first predetermined value establishes a fuel cloud in the combustion chamber in the proximity of the spark means.

20. An internal combustion engine having a combustion chamber and spark means to ignite a fuel-air mixture in the combustion chamber, and apparatus as claimed in claim 12, 13 or 14 wherein said port when open defines an annular passage divergent in the direction of flow of the charge therethrough, and a coaxial annular surface extending outwardly from said passage at the downstream end thereof at a divergent angle greater than that of the passage, so that at metered quantities of fuel below said first predetermined value the fuel spray issuing from the passage will deflect outwardly to flow across said annular surface, said port being located so that the fuel spray issuing when the metered quantity is below said first predetermined value establishes a fuel cloud in the combustion chamber in the proximity of the spark means.

21. An internal combustion engine as claimed in claim 19 wherein the internal combustion engine operates on the two stroke cycle.

22. An internal combustion engine including an apparatus for injecting fuel as defined in claim 12, 13 or 14.

23. In automotive vehicle an internal combustion engine as claimed in claim 19.

24. An internal combustion engine as claimed in claim 19 being an outboard marine engine.

25. A method of injecting liquid fuel into a spark ignited internal combustion engine having a combustion chamber, comprising,
 entraining a metered quantity of liquid fuel in a gas to provide a fuel-gas charge,
 varying the metered quantity of fuel in response to the load demand of the engine,
 delivering the fuel-gas charge to the combustion chamber through a selectively openable port having a fixed configuration when open, and
 controlling the degree of penetration of the fuel spray issuing from the open fuel port into the combustion chamber such that at metered quantities of fuel below a predetermined value the degree of penetration is less than the degree of penetration when the metered quantity of fuel issuing from the open port is above the predetermined value, by controlling the fuel to gas ratio of the fuel-gas charge delivered through the open port.

26. Apparatus for injecting liquid fuel into a combustion chamber of a spark ignited internal combustion engine, comprising
 establishment means for establishing a mixture of liquid fuel and gas as a fuel-gas charge to be delivered to the combustion chamber,
 metering means for varying the quantity of fuel in said charge in accordance with engine load demand,
 and delivering means for delivering the fuel-gas charge through a selectively openable port means to the combustion chamber as a fuel spray, said port means, having a fixed configuration when open, for causing the fuel-gas charge to respond to the quantity of fuel therein so that when the quantity of fuel in the charge is below a first predetermined value the fuel spray issuing from the port means into the combustion chamber has a degree of penetration into the combustion chamber less than that of the fuel spray issuing when the quantity of fuel is above a second predetermined value which is greater than the first predetermined value.

* * * * *